Jan. 2, 1962    D. M. SCHWARTZ    3,015,397
FILTER VALVE CONSTRUCTION
Filed Aug. 22, 1957    3 Sheets-Sheet 1

INVENTOR
DANIEL M. SCHWARTZ
BY Harold T. Stowell
   Harold L. Stowell
ATTORNEYS

Jan. 2, 1962   D. M. SCHWARTZ   3,015,397
FILTER VALVE CONSTRUCTION
Filed Aug. 22, 1957   3 Sheets-Sheet 2
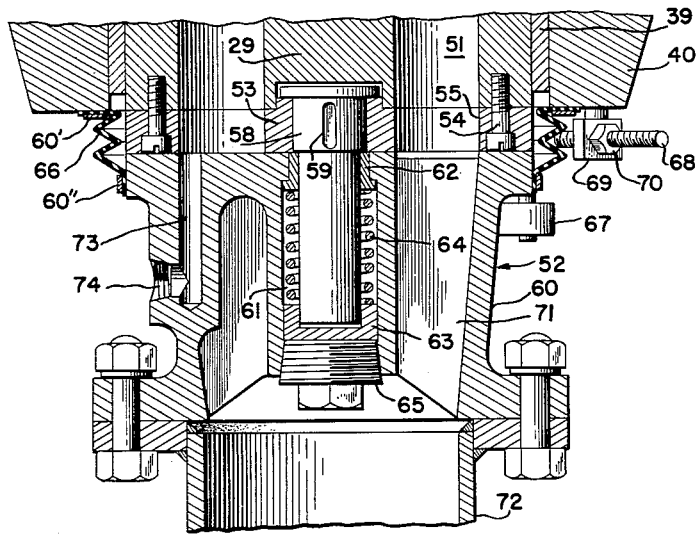
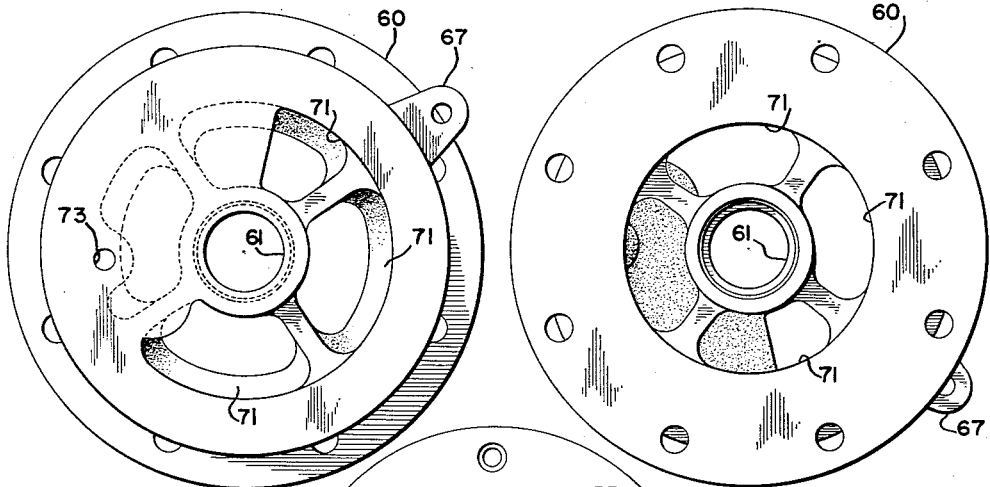
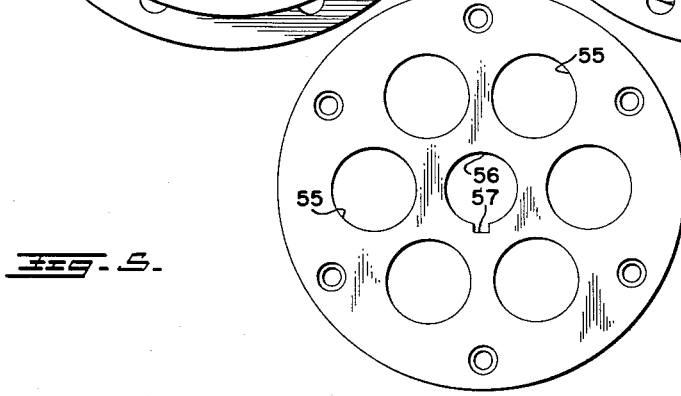
INVENTOR
DANIEL M. SCHWARTZ
BY Harold T. Stowell
Harold L. Stowell
ATTORNEYS

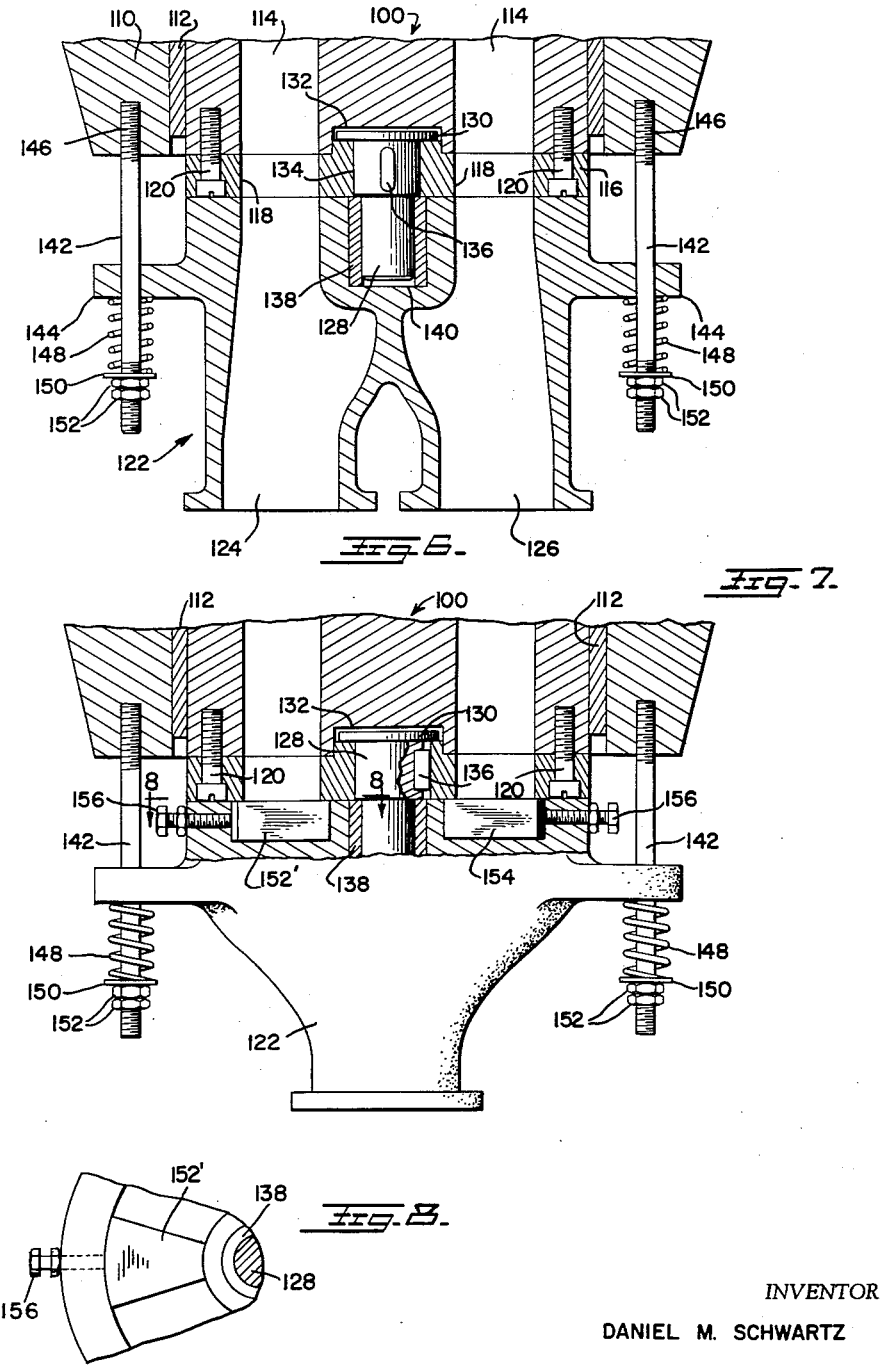

United States Patent Office 3,015,397
Patented Jan. 2, 1962

3,015,397
FILTER VALVE CONSTRUCTION
Daniel M. Schwartz, Salt Lake City, Utah, assignor, by mesne assignments, to The Eimco Corporation, Salt Lake City, Utah, a corporation of Delaware
Filed Aug. 22, 1957, Ser. No. 679,625
2 Claims. (Cl. 210—395)

This invention relates to an improved rotary filter valve for rotary filters such as rotary pan filters, rotary drum filters, rotary disc filters and the like wherein a main filter valve is employed to interconnect, in a predetermined relation, one or more filter sections with a source of reduced pressure.

It is an object of the invention to provide an improved rotary valve wherein the construction and arrangement of the valve mechanism is sturdy and free from delicate parts that ordinarily are the source of much operating difficulty.

A further object is to provide such a valve that permits a filter to operate more efficiently and to function with greater accuracy and economy under a wide range of operating conditions.

A further object is to provide such a valve having large ports, streamlined passages and direct flow of filtrate therethrough whereby greater tonnages of slurry may be dewatered, to a lower moisture content, at extremely low overall costs.

It is a further object to provide an improved rotary filter valve which greatly reduces vacuum losses by reducing turbulent flow, and flow resistant bends thereby providing smooth unrestricted flow of filtrate from any of the plural valve ports.

These and other objects and advantages are provided in the improved valve construction for rotary filters which includes rotating port means communicating with a plurality of filter sections of a rotary filtering apparatus, a stationary valve block in operative relation to said port means having openings therethrough communicating with selected openings in said port means upon rotation of the port means, the openings in said valve block being shaped to provide a substantially rectinlinear flow path through the openings therein and to selected openings in the port means, and means for maintaining alignment of said valve block with said port means.

The improved rotary filter valve of the invention will be more particularly described with reference to the accompanying drawings showing the valve applied to a rotary pan filter of the type disclosed in my Patent 2,637,443, filed October 13, 1947 and issued May 5, 1953 and my copending application Serial Number 344,981 now United States Patent 2,811,259 dated October 29, 1957 of which this application is a continuation-in-part.

In the drawings:

FIG. 2 is an enlarged detailed sectional view of a valve and associated parts of the filter taken at opposite hand to the view of FIG. 1;

FIG. 3 is a plan view of the main filter block shown on the same scale as FIG. 2;

FIG. 4 is a bottom view of the valve block of FIG. 3;

FIG. 5 is a bottom view of the main valve wear plate on the same scale as FIG. 2;

FIG. 6 is an enlarged detailed sectional view of a modified form of the present invention;

FIG. 7 is a fragmentary sectional view of the valve shown in FIG. 6 taken at opposite hand thereto; and FIG. 8 is a fragmentary detailed section of one of the bridge blocks 152' taken substantially on line 8—8 of FIG. 7.

Figure 1:
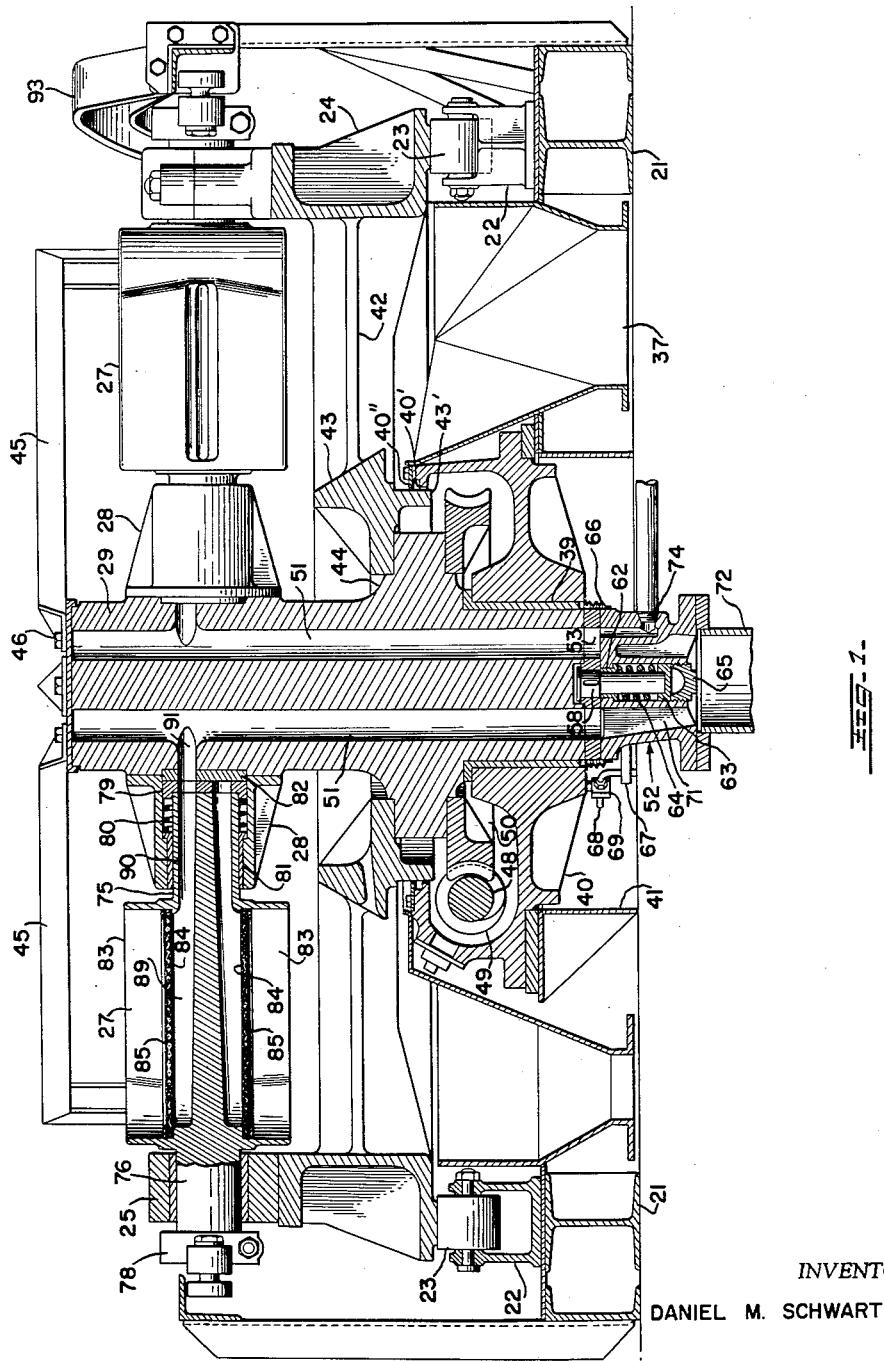
FIG. 1 is a vertical sectional view of a rotary pan filter having connected thereto the improved valve means of the invention.

Referring to FIGS. 1 through 5 of the drawings, in which like reference numerals in the several views refer to corresponding parts, the filter illustrated generally in FIG. 1 has a bed 21 which carries brackets 22 mounting a plurality of horizontal rollers 23. The rollers 23 are circularly arranged and support thereon a ring or spider 24 for rotation about the vertical axis of the ring. A plurality of bearing blocks 25 are mounted on the top of the ring, and these in turn support the radially outer ends of filter pans 27, the inner ends of which are carried in bearings 28 mounted on a central column 29. The column, as will appear more fully hereinafter, is mounted in a main bearing for rotation about its vertical axis and the ring 24 is united to the column by structural members for rotation therewith.

The central column 29 is mounted in a main sleeve bearing 39 supported in the worm gear box or housing 40 carried in turn by the frame member 41. It will be seen that the spider 24 is connected by integral radial structural arms 42 to the hub 43 which is bolted or otherwise suitably joined to the collar 44 forming a part of the central column 29.

Power for rotating the filter is supplied to worm shaft 48 from a power source (not shown) and transmitted from the worm 49 to the worm wheel 50 that is bolted or otherwise affixed to the underside of the collar 44.

The hub 43 is removably secured to the collar 44, as by screws (not shown) and has a depending cylindrical skirt portion 43' that projects into the circular opening provided by the annular flange 40' of the gear housing 40 and slidingly engages a packing included between the retainer ring 40", secured to the top of the housing, and the annular flange 40', thus insuring that the interior of the gear housing is properly sealed. It will be noted that the diameter of the opening 40' in the gear housing is slightly greater than the diameter of the worm wheel 50 so that the latter may be conveniently inserted into and removed from the housing.

Central column 29 has a plurality of longitudinal conduits 51, one corresponding to each filter pan, and through these conduits connection is made between the filter pans and the main valve assembly, generally designated 52.

As best seen in FIG. 2, the central column is provided at the bottom with a combined wear plate and valve block support 53 that is secured to the column by screws 54. As shown in bottom view in FIG. 5, the plate 53 has a plurality of holes or column ports 55 that register with the conduits 51 in the column when the plate is bolted in place and provide substantially rectilinear flow for gases, liquid and the like passing through the ports 55 into the conduits 51.

A valve shaft 58 is secured in bore 56 in the plate 53 by means of a key (not shown) inserted in the socket 59 and engaging the keyway 57.

Valve block 60 has a central cylindrical chamber 61 into which the valve shaft 58 depends. The top opening of the chamber is fitted with a bushing 62 in which the shaft 58 rotates. A combination bushing and spring retainer 63 is fastened to the bottom of the valve shaft and rotates in the chamber 61 engaging the interior walls thereof. Compressed between the bushing 62 and the spring retainer 63 is a spring 64 which presses the bushing 62 and the valve block into tight sliding engagement with the wear plate 53. The bottom opening of the chamber 61 is closed by a pipe plug 65.

A dust boot 66 is fastened between the worm gear housing 40 and the valve block 60 by rings 60' and 60".

The valve block is prevented from rotating with the central column 29 by connecting it through an adjustable connection to the worm gear housing 40. Such connection includes the arm 67, and the angle arm 68, and the bracket 69. A nut 70 retains the angle arm 68 in position in the bracket 69, and by adjusting the position of the nut on the arm, it will be seen that the angular relationship of the valve block to the gear housing may be varied within certain limits.

The valve block is provided with suction passages 71 which extend in a straight path through the block and register with the openings or ports 55 in plate 53 as the valve is rotated again permitting unrestricted rectilinear flow through the valve into the conduits 51 when the ports are in the open position. A suction pipe 72 is bolted to the bottom of the block. As will be understood, the suction pipe connects with a conventional evacuator (not shown).

A blow port 73 may be provided in the valve block and is connected to a source of compressed air (not shown) through tapped opening 74; or the blow port may be left open to the atmosphere.

Referring to FIG. 1 each of the filter pans has a radial inner trunnion 75, borne in bearing 28 on the center column, and a radial outer trunnion 76, journalled in bearing 25 carried by the outer ring of the spider 24. The outer trunnion 76 has an end portion to which is attached a reversing lever 78.

The inner end of trunnion 75 is provided with a wear plate 79 rigidly fastened to the trunnion, and a spring 80 is compressed between the wear plate 79 and a bushing 81 in the bearing 28. The spring 80 forces the wear plate 79 and the filter pan into sealing engagement with a valve seat 82 carried by the center column. The periphery of the wear plate has clearance within the bearing 28. A sealing ring 81 is received within the outer end of the bearing 28 and engages the trunnion 75 to retain lubricant within the bearing.

Each of the filter pans 27 has an identical filter cell on its top and bottom. The upstanding sides 83 of the cell provide a receiver for a charge of slurry to be filtered. The bottom of the charge receiver is formed of a filter medium consisting of a rigid wire screen 84 overlayed by a piece of filter cloth 85.

Each filter cell has an inner chamber 89 connected by a conduit 90 extending through the inner trunnion to a port 91 leading to one of the vertical conduits 51 in the center column.

An automatic device is provided for rotating each pan one half of a revolution on its trunnions for each revolution of the center column and spider as more fully set forth in my Patent No. 2,637,443.

In operation rotation of the filter is in a clockwise direction. The cycle of operation will be described for a single pan, it being understood that succeeding pans will follow the same cycle with a sixty degree lag.

The cycle will be assumed to start after the suction phase has been completed and the column port of the main valve begins to overlap the blow port 73. The column port and blow port are of such size and so positioned with relation to each other that blowing continues through a 45° rotation of the filter. For the first 5° of the blowing phase, the pan remains horizontal and the cake is raised from the filter cloth and loosened preparatory to dumping. After the 5°, the turning lever 78 and cam 93 begin to cooperate to invert the pan and such operation continues through an arc of 40°; at this point the pan is completely inverted and the cake has been dumped. Blowing pressure is maintained on the upper or cake-containing cell from the 0° position to the 35° position; and, during the last 10° of filter rotation as the turning of the pan is being completed, the blowing pressure is shifted by operation of the pan valve 79—82 to the empty cell just coming into upper position.

After the first 45° of filter rotation the column port passes the blow port, and, during the next 60° of travel, the column port is blanked off by a portion of the solid area of the main valve block as seen in FIG. 3. In this sector, the pan passes under a sluiceway and the upper cell is filled. The blanking off during filling prevents applying suction to the pan until it is completely filled so that air is not drawn through the filter medium reducing suction to the other pans. With materials that are fairly fluid, flowing out freely to cover the bottom of the pan, the blank section may be reduced.

Beginning at 105°, the column port registers with the suction passages 71 in the valve block and suction is applied to the upper cell during substantially the entire balance of the cycle. The suction applied to the suction passages 71 removes the moisture from the slurry to be filtered with the moisture passing through passages 91, vertical bores 51, openings 55 in wear plate 53, thence through suction passages 71 of the main body of the valve to the outlet 72 which as hereinbefore described is connected to a suitable source of vaccum. Withdrawal of the moisture from the slurry to be filtered leaves within each of the filter pans a filter cake which is subsequently dumped into hopper 37 when the particular filter pan is inverted through the cooperation of the turning lever 78 and the cam 93 as more fully described in my Patent 2,637,443. In the last few degrees of the cycle, the column port is again blanked off by a solid portion of the valve block just prior to registry of the column port and the blow port and the beginning of a new cycle.

It will be understood that the cycle just described is merely exemplary and that the several phases of operation may be varied in duration within wide limits by appropriate valve design. Moreover, the blowing phase may be omitted entirely, if desired.

A modified form of the invention is shown in FIGS. 6 and 7 where the novel susbtantially rectilinear flow feature is incorporated in the commonly employed two-port rotary filter valve. Referring to FIGS. 6 and 7, 100 designates the pipe plate or rotating port means of the valve which is supported in a suitable trunnion 110 provided with bearing surface means 112 between the stationary and rotating parts thereof. The rotating pipe plate 100 is provided with a plurality of bores 114 which are connected to the filter sections of a rotary pan, rotary drum, rotary disc or the like filter. Bolted to the extended end of the pipe plate 100 is a wear plate 116 provided with a plurality of bores 118 corresponding in number and size to the bores 114 in the pipe plate 100. By bolting the wear plate 116 by bolts 120 to the pipe plate 100, it will be seen that both of these structures form rotating portions of the novel valve. At the remote end of the wear plate 116 is a two port valve lock 122 provided with outlet ports 124 and 126, the function of which will be described in greater detail hereinafter.

The valve block 122 is axially mounted to the rotating pipe plate 100 by a center bolt 128 having a head portion 130 which is received in recess 132 in the pipe plate 100. A bore 134 in the wear plate 116 permits the passage of the center bolt 130 therethrough. The bore 134 snugly receives the center bolt 130 and is keyed therein by key 136 so that when the wear plate 116 is bolted to the pipe plate 100 an extended end portion of the bolt 128 projects outwardly therefrom. The projected end of the bolt 128 is rotatably mounted in bearing 138 maintained in a recess 140 in the valve block 122. With this arrangement, it will be seen that the valve block 122 may be maintained in a fixed position relative to the non-moving portion 110 of the trunnion bearing assembly for the valve. Maintenance of the fixed relationship between the trunnion 110 and the valve block 122 is provided by a plurality of bolts 142 which pass through bores in a flange or ears 144 secured about the valve block. The extended ends 146 of the bolts 142 threadedly engage the stationary part 110 of the trunnion. The other ends of the bolts 142 receive springs 148, washer or plate means 150, and a pair of lock nuts 152. The springs, lock nuts and plate means in cooperation with each of the bolts 142 resiliently urge the valve block 122 into sealing engagement with the wear plate 116 and compensates for wear in the plate 116 during use of the valve.

In order to control the flow of filtrate from various sections of the filter to port means 124 and 126 through one or more of the plural openings 118 in the wear plate 116 and the conduits 114 in the pipe plate 100, the valve block 122 is provided with one or more adjustable bridge pieces 152 and 154 shown in FIG. 7 of the drawings. The bridge pieces 152' and 154 are maintained in a predetermined position within the valve block by set screws 156 threadedly engaging the valve block and contacting the outer peripheral surface of the bridge pieces as more fully shown in FIGS. 7 and 8 of the drawings. With the two port type of rotary filter valve, one of the ports, for example, port 124 is connected to a source of reduced pressure and the other port 126 is connected to an additional source of reduced pressure which may be less than the reduced pressure connection to port 124 whereby a strong vacuum is maintained on a predetermined filter section or sections while the moisture content of the filter cake is high and a reduced vacuum may be applied to the same filter section as the drying process continues and open spaces have formed in the substantially dehydrated filter cake. On valves where only one suction port is provided, it is more difficult to maintain a high vacuum for the preliminary drying due to the formation of cracks in the partially dehydrated filter cake. Through the use of two vaccum ports this inherent disadvantage in the single port type valve is eliminated.

As will be clearly seen from FIG. 6 of the drawings, the port means 124 and 126, the bores in the wear plate 116 and the corresponding bores 114 in the pipe plate 100, are in substantial alignment during the suction portion of the filtration cycle whereby a high vacuum along with reduction in turbulence and wear in the valve is maintained as more fully described with reference to the form of invention shown in FIGS. 1 through 5.

While the present invention has been described in detail in reference to a rotary pan filter, it will be evident that the novel valve construction may be used in a horizontal position and that rotary disc filters or a rotary drum filter could be substituted for the pans 27 without departing from the scope of the present invention.

I claim:
1. In a rotary filtering apparatus including a plurality of filter sections, a relatively rotating port means communicating with the filter sections, a stationary valve block in operative relation to said port means, said stationary valve block being provided with plural openings therethrough communicating with at least two selected openings in said port means upon rotation of the port means, the plural openings in said valve block being shaped to provide a substantially rectilinear flow path therethrough and to said selected openings in the port means whereby turbulent flow through the valve means is substantially eliminated and adjustable bridge means carried by said valve block for effecting controlled communication between the plural openings in the valve block and selected ports in said relatively rotating port means.

2. In a rotary filtering apparatus including a plurality of filter sections, a relatively rotating port means having arcuately spaced openings therein communicating with the filter sections, a stationary valve block in operative relation to said port means, said stationary valve block having openings extending rectilinearly through the valve block and each of said valve block openings communicating with at least two selected arcuately spaced openings in said port means upon rotation of the port means, said valve block openings being shaped to provide a substantially rectilinear flow path through the valve block openings to and through said selected arcuately spaced openings in the port means, and means for maintaining alignment of said valve block with said port means.

References Cited in the file of this patent
UNITED STATES PATENTS

| | | |
|---|---|---|
| 1,668,557 | Grondal | May 8, 1928 |
| 1,765,252 | Vernay | June 17, 1930 |
| 1,878,998 | Akins | Sept. 27, 1932 |
| 1,917,818 | Woodworth | July 11, 1933 |
| 2,352,330 | Lee | June 27, 1944 |
| 2,563,205 | Barnebl | Aug. 7, 1951 |
| 2,637,443 | Schwartz | May 5, 1953 |